United States Patent [19]

Avery et al.

[11] 4,132,134

[45] Jan. 2, 1979

[54] VEHICLE FINAL DRIVE ASSEMBLY

[75] Inventors: Bennett W. Avery; Charles H. Herr, Jr.; Ivan R. Lamport, all of Peoria, Ill.

[73] Assignee: Caterpillar Tractor Co., Peoria, Ill.

[21] Appl. No.: 809,721

[22] Filed: Jun. 24, 1977

[51] Int. Cl.² .................... F16H 1/28; F16H 35/00; B60K 17/00

[52] U.S. Cl. ................................ 74/801; 74/391; 180/43 B; 180/75

[58] Field of Search .............. 74/801 U, 396, 391, 74/410; 180/75, 70 R, 43 B

[56] References Cited

U.S. PATENT DOCUMENTS

| | | | |
|---|---|---|---|
| 3,171,294 | 3/1965 | Mazzarins | 74/391 |
| 3,184,985 | 5/1965 | Dreitzler | 74/377 |
| 3,365,986 | 1/1968 | Mazziotti | 74/801 |
| 4,037,694 | 7/1977 | Keese | 192/4 A |

*Primary Examiner*—Leonard H. Gerin
*Attorney, Agent, or Firm*—Charles E. Lanchantin, Jr.

[57] ABSTRACT

A vehicle final drive assembly includes a housing structure, a final drive gear having an internal coupling, an axis and a central load bearing plane transverse to the axis, a bearing assembly connected between the housing structure and the final drive gear for supporting the final drive gear for rotation about the axis, the bearing assembly being located substantially on the central plane of the final drive gear, and a shaft having an external coupling connected to and supported by the internal coupling of the final drive gear.

11 Claims, 2 Drawing Figures

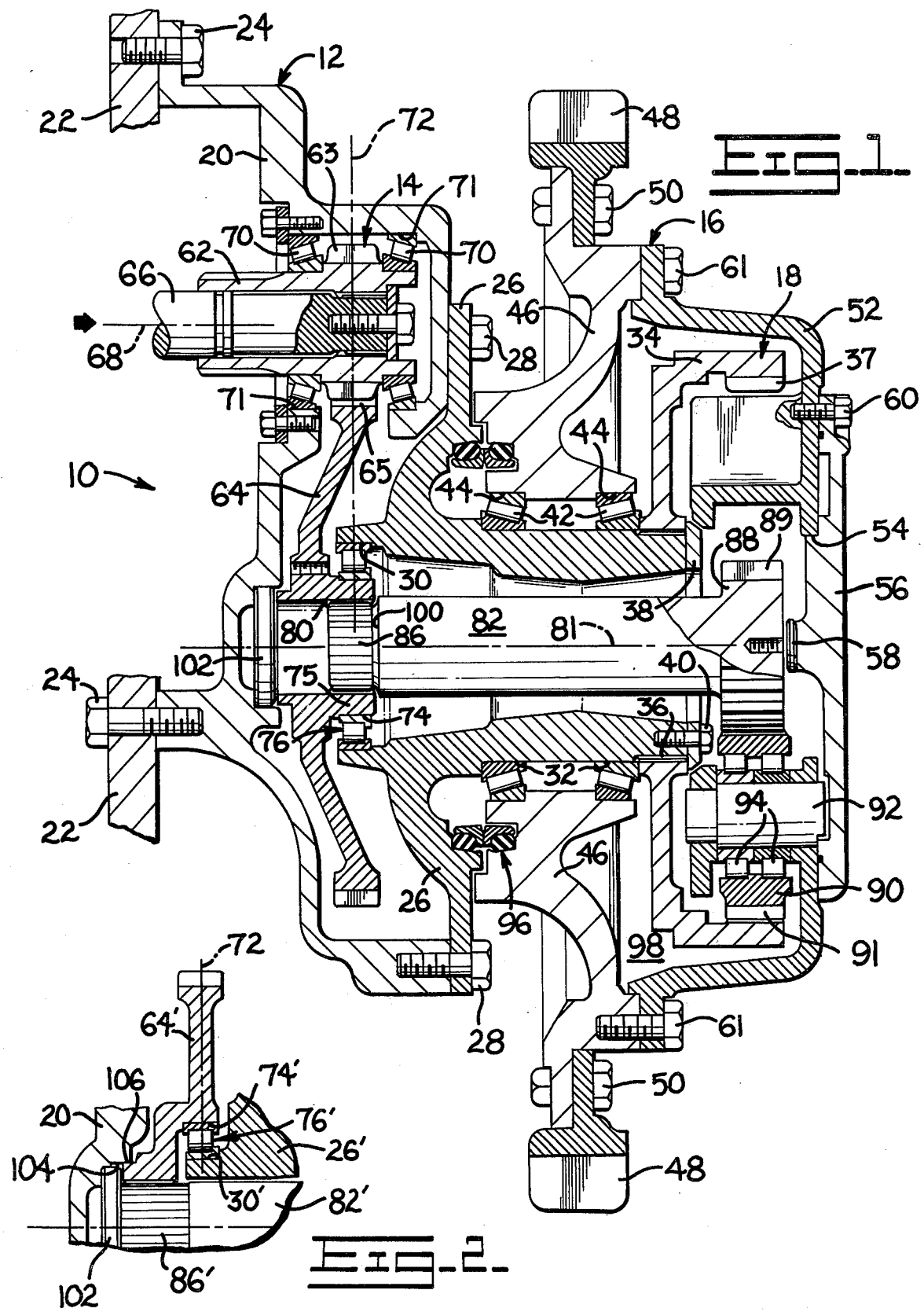

VEHICLE FINAL DRIVE ASSEMBLY

BACKGROUND OF THE INVENTION

This invention relates generally to a final drive assembly for a vehicle such as a track-type tractor.

Final drives for track-type tractors are known which have a first reduction gear group including an input pinion gear and intermeshing bull gear, and a second reduction gear group which is a planetary gear transmission. A sun gear shaft is driven by the bull gear and provides the input to the planetary transmission, and the ring gear of the planetary is fixed so that the planet gears drive the planet carrier member and the sprocket. Heretofor, this construction has exhibited several problems. Firstly, the sun gear shaft has been supported in such a manner that loads from the bull gear are undesirably transmitted through the sun gear and to the rolling bearings of the planet gears. Secondly, the sun gear shaft has been supported in such a manner that it could not be axially removed for servicing without substantially complete disassembly of the final drive. And thirdly, many final drives require that the sprocket be removed in order to disassemble and inspect the planetary gear transmission or to axially withdraw the sun gear shaft, and this requires that the track entrained about the sprocket be disassembled at additional expense.

SUMMARY OF THE INVENTION

The present invention is directed to overcoming one or more of the problems as set forth above.

According to the present invention this is accomplished by providing a vehicle final drive assembly including a housing structure, a final drive gear having an internal coupling, an axis and a central load bearing plane transverse to the axis, a bearing assembly connected between the housing structure and the final drive gear for supporting the final drive gear for rotation about the axis, the bearing assembly being located substantially on the central plane, and a shaft having an external coupling connected to and supported by the internal coupling of the final drive gear.

BRIEF DESCRIPTION OF THE DRAWINGS

FIG. 1 is a diagrammatic elevational sectional view of the final drive assembly of the present invention taken along an upright plane passing through the axes of the input pinion gear and the final drive gear or bull gear.

FIG. 2 is a fragmentary, diagrammatic elevational sectional view of an alternate embodiment final drive assembly constructed in accordance with the present invention

DETAILED DESCRIPTION

Referring to the drawing, a final drive assembly 10 constructed in accordance with the present invention is shown for use on a vehicle such as a track-type tractor. In general, a housing structure 12 supports and protects a first reduction gear group 14, and a rotating housing structure 16 supports and protects a second reduction gear group or planetary transmission 18.

The first major element of the housing structure 12 is a case 20 releasably connected to a frame 22 of the tractor by a plurality of bolts 24. The second principal element of the housing structure is a hollow spindle member 26 which serves as a bearing support member and partial cover and which is releasably connected to the case by a plurality of bolts 28. A bearing seat 30 is formed on the axially inside end of the hollow spindle member, a pair of axially spaced apart and external bearing seats 32 are formed on the outside end thereof, and a ring gear 34 is releasably connected thereto by suitable coupling splines at 36. The ring gear has internal gear teeth 37, thus providing a stationary reaction element for the planetary transmission 18. A retaining plate 38 is secured to the axially outer end of the spindle member by a plurality of bolts 40 for axially clamping the ring gear in place. Such loading also urges the ring gear axially against one of a pair of tapered rolling bearing assemblies 42 located on the bearing seats 32 and located on a pair of axially spaced apart and opposed bearing seats 44 formed within the rotating housing structure 16 radially opposite thereto.

More particularly, the rotating housing structure 16 includes a hub 46 mounted on the bearing assemblies 42, a track-chain-driving sprocket 48 of conventional segmented construction releasably secured to the hub by a plurality of peripherally spaced threaded retaining assemblies 50, a planet carrier member 52 having a central opening 54 therethrough, and a cover assembly 56. The cover assembly has a wear-resistant end plate or button insert 58 connected to the inside surface thereof, and the cover assembly is releasably connected to the carrier member 52 by a plurality of peripherally spaced retaining bolts 60, only one shown. Likewise, the carrier member is releasably connected to the hub 46 by a plurality of bolts 61.

The first reduction gear group 14 is of the spur gear type, including a pinion gear 62 having gear teeth 63 driving engaged with a final drive gear or bull gear 64 having gear teeth 65. The pinion gear is driven by an input shaft 66 and is supported for rotation about an axis 68 within the case 20 by a pair of axially spaced apart and tapered rolling bearings 70 which straddle the pinion seat teeth. Advantageously, the bearings 70 are maintained in positive alignment by their being mounted on a pair of bearing seats 71 line bored in the case. A central load bearing plane 72 is thus defined centrally of the gear teeth 63 and centrally between the bearings 70, which plane is transverse to the axis 68. Preferably, the gear teeth 65 of the bull gear are symmetrically arranged on this plane, as is also a bearing seat 74 formed on an axially outwardly extending hub 75 on the bull gear. A rolling bearing assembly 76 is disposed on the bearing set 74 and on the bearing seat 30 of the hollow spindle member 26. With this construction, forces are transmitted generally in the central plane 72 from the pinion gear and the bull gear substantially directly to the relative rigid hollow spindle member.

The bull gear 64 also has an internal coupling such as a plurality of driving splines 80 formed within the hub 75. These driving splines are preferably cencentrically positioned on a central axis 81 of the bull gear and provide the input to an elongated sun gear shaft 82 having a central axis substantially coextensive with the axis 81 of the bull gear. Particularly, an external coupling such as a plurality of driven splines 86 are formed on the inner end of the sun gear shaft and which splines are intermeshingly connected to the driving splines 80 of the bull gear. Preferably, a sun gear 88 having a plurality of gear teeth 89 is formed integrally on the axially outer end of the sun gear shaft, although it is to be appreciated that the sun gear could be separately made and releasably secured to the shaft. The sun gear teeth 89 and the splines 86 are thus substantially concentrically arranged on the axis 81, and it is the sun gear that provides the input to the planetary transmission 18.

The planetary transmission 18 further includes a plurality of planet gears 90 having gear teeth 91, only one of which is shown for illustrative convenience, which gears are rotatably mounted on a corresponding number of planet shafts 92 as by a pair of spaced apart rolling bearing assemblies 94. Since the planet shafts are releasably connected to the carrier member 52 at substantially uniformly spaced peripheral locations, it is clearly apparent that rotation of the sun gear 88 causes the intermeshing planet gears to walk around the stationary ring gear 34. Accordingly, the carrier member 52 is forced to rotate to drive the sprocket 48 in the desired direction.

An annular seal assembly 96 of the usual type is seated within the stationary spindle member 26 and the rotating hub 46 in order to retain a lubricating fluid such as oil within an internal chamber 98 of the final drive assembly 10.

Thus, the final drive assembly 10 has an improved construction for supporting the rotating sun gear shaft 82. At its inner end it is radially supported solely through the interengaged splines 80 and 86, and advantageously the single rolling bearing assembly 76 disposed on the central plane 72 of the bull gear 64 is of a construction sufficient for directing substantially the entire forces on the bull gear to the supporting spindle member 26 without directing any significant and undesired force couple to the sun gear shaft. It is to be appreciated that the axially opposite end of the sun gear shaft is stabilized and rotatably supported by the intermeshing action of the sun gear teeth 89 in the planet gear teeth 91 making the central axis of the shaft run true. Theoretically, with this construction the planet gears 90 and the planet carrying bearing assemblies 94 desirably do not carry bull gear support loads.

It is of substantial significance to note that the hollow spindle member 26 has surfaces which are substantially generated surfaces of revolution symmetrically about the axis 81 which provides certain manufacturing advantages. Moreover, both the bearing assembly 76 and the bearing assemblies 42 are supported by the spindle member so that the bull gear 64 is tied into it at one end and the planet carrier member 52 and the planets 90 are tied into it at the other end for more positive retainment of alignment therebetween and more effective support of the floating sun gear shaft 82. Also, the sun gear shaft is limitedly free to float through the support construction provided at its opposite ends. Axial outward movement thereof is limited by the end face of the end plate 58 in the cover assembly 56 and, in the instant example axial inward movement is limited by a shoulder 100 on the shaft which may make contact with the hub 75 of the bull gear.

Another advantage of the final drive assembly 10 is that the sun gear shaft 82 may be withdrawn or pulled axially outwardly from its location within the hollow spindle member 26 subsequent to removing the bolts 60 and the cover assembly 56. This permits a service tool shaft, not shown, to be engaged with the bull gear splines 80 for measuring speed and horsepower available to the final drive assembly at that point without going through the planetary transmission 18 or without the need for rotating the carrier member 52 and the associated sprocket 48. Should it be desirable to service the planetary transmission 18, this may be easily accomplished by disassembly of the retaining bolts 61 from the hub 46 and outward removal of the carrier member 52 with the planet gears 90 thereon.

Referring now to the alternate embodiment shown in FIG. 2, wherein reference numerals similar to those described above are utilized with prime indicators theron to identify comparable elements, it is apparent that it differs from the preferred final drive assembly, primarily in the area of the bearing assembly 76'. Specifically, the hollow spindle member 26' has an external bearing seat 30' and the bull gear has an internal bearing seat 74°, rather than the other way around as previously described. However, these seats are still substantially centered on the load bearing plane 72. Also, in FIG. 2, it is apparent that axially inward movement of either the bull gear 64' or the sun gear shaft 82' is limited by a wear-resistant end plate or button insert 102 secured to the case 20. Moreover, a cylindrical bore 104 in the case 20 represents a slight diametral clearance with respect to a cylindrical surface 106 on the bull gear for piloting of the bull gear generally on the axis 81 during the initial stages of assembly of the final drive assembly. In other respects it is clear that it retains the features of the preferred embodiment.

Other aspects, objects, and advantages of the present invention will become apparent from a study of the specification, drawings, and appended claims.

The embodiments of the invention in which an exclusive property or privilege is claimed are defined as follows:

1. A vehicle final drive assembly comprising:
   a housing structure;
   a pinion gear rotatably supported in said housing structure;
   a final drive bull gear having an internal coupling, an axis and a central load bearing plane transverse said axis, said bull gear being driven by said pinion gear;
   a rolling bearing assembly connected between said housing structure and said bull gear and supporting said bull gear for rotation about said axis, said bearing assembly being located substantially on said central plane; and
   a shaft having an external coupling drivingly connected to and supported by said internal coupling of said bull gear, and said shaft being driven by said bull gear.

2. The final drive assembly of claim 1 wherein said internal coupling is a plurality of internal splines and said external coupling is a plurality of external splines.

3. The final drive assembly of claim 2 wherein said shaft has axially inner and outer ends, and a sun gear at said outer end.

4. The final drive assembly of claim 2 wherein said internal splines of said bull gear are disposed radially inwardly of said bearing assembly.

5. The final drive assembly of claim 1 including a planetary reduction gear group and wherein said shaft has axially inner and outer ends and a sun gear at said outer end, said sun gear being coupled to and supported by said planetary reduction gear group.

6. The final drive assembly of claim 5 wherein said planetary reduction gear group includes a rotating carrier member and a releasably cover assembly thereon, said final drive assembly includes bearing means for rotatably supporting said carrier member on said housing structure, and said final drive assembly is of a construction sufficient for axial withdrawal of said shaft therefrom subsequent to removal of said cover assembly from said carrier member.

7. The final drive assembly of claim 6 including a hub and a sprocket, said sprocket being releasably connected to said hub and said hub being releasably connected to said carrier member.

8. A final drive assembly comprising:
a housing structure;
an input pinion gear having a plurality of gear teeth, first bearing means connected between said housing structure and said pinion gear for rotatably supporting said pinion gear;
a final drive gear having an internal coupling, an axis and a central load bearing plane transverse said axis, said pinion gear being drivingly engaged with said final drive gear, and said first bearing means being of a construction sufficient for substantially centering said pinion gear teeth on said central plane;
second bearing means connected between said housing structure and said final drive gear for supporting said final drive gear for rotation about said axis, said bearing means being located substantially on said central plane; and
a shaft having an external coupling drivingly connected to and supported by said internal coupling of said final drive gear, and said shaft being driven by said final drive gear.

9. A vehicle final drive assembly comprising:
a housing structure having a hollow supporting spindle member;
a final drive bull gear having an axis, a plurality of gear teeth, a plane through said gear teeth and transverse said axis, and an internal coupling;
bearing means connected solely between said spindle member and said bull gear for rotatably supporting said bull gear on said axis, said bearing means being located substantially on said plane;
a planetary reduction gear group having a carrier member, a ring gear, a plurality of planet gears, and a sun gear, said carrier member being rotatably mounted on said spindle member, said ring gear being connected to said spindle member, said planet gears being rotatably mounted on said carrier member; and
a shaft having an external coupling at one end connected to and driven by said internal coupling of the bull gear, said shaft being connected to and driving said sun gear at the other end, said shaft being of a construction sufficient for floating operation between said internal coupling and said planet gears.

10. The final drive assembly of claim 9 wherein said bearing means is a single rolling bearing assembly.

11. In a vehicle final drive assembly of the type having a housing structure, a planetary reduction gear group supported by the housing structure, a pinion gear rotatably supported in the housing structure, a final drive bull gear driven by the pinion gear and having an axis, a plurality of gear teeth, a central plane through the gear teeth and transverse the axis, the improvement comprising:
a single rolling bearing assembly connecting said housing structure and said bull gear and supporting said bull gear for rotation about said axis, said bearing assembly being located substantially on said central plane; and
a shaft having axially inner and outer ends and a sun gear at said outer end, said shaft being supported at said inner end by said bull gear and at said outer end by said planetary reduction gear group.

* * * * *